United States Patent Office 2,731,487
Patented Jan. 17, 1956

2,731,487

ASYMMETRIC TERTIARY ALKYL TRITHIOCARBONATES

Joseph T. Bashour, New York, N. Y., assignor to Stauffer Chemical Company, a corporation of Delaware No Drawing. Application August 11, 1951,
Serial No. 241,492

7 Claims. (Cl. 260—455)

This invention relates to certain tertiary alkyl trithiocarbonates, to the process for making the same, and to the use of such compounds as pesticides.

The compounds of the present invention have the following formula:

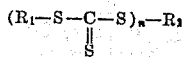

In the above formula, $n$ is an integer of from 1 to 4, $R_1$ is a tertiary alkyl group having from 4 to 16 carbon atoms, and $R_2$ is an organic radical which may contain a halogen substituent.

As suitable tertiary alkyl radicals which may occupy the position of $R_1$, the following are given by way of non-limiting examples: Tertiary butyl, tertiary pentyl, tertiary hexyl, tertiary octyl, tertiary decyl, tertiary dodecyl, tertiary tridecyl, tertiary tetradecyl and tertiary hexadecyl.

In the above formula, $R_2$ can be any organic radical which differs from $R_1$, including alkyl radicals such as ethyl, isopropyl, butyl, pentyl, heptyl, cyclohexyl, octyl, crotyl or allyl; aryl radicals such as phenyl, naphthyl, penanthryl, anthracyl; alkaryl radicals such as tolyl, ethylphenyl, dimethyl phenyl, diethyl phenyl or cumyl; or aralkyl radicals such as benzyl and heterocyclic radicals such as furyl, pyridyl, pyranyl, or pyrryl. In addition, the aromatic radicals which have been mentioned may have attached thereto one or more functional groups such as a chloro, nitro, aceto or methoxy group. Thus, $R_2$ may be a 4-chlorobenzyl, 3,4-dichlorobenzyl, 2,4,6-trichlorobenzyl, 4-nitrobenzyl, or 4-methoxybenzyl radical.

Certain specific compounds which are illustrative of the compounds of the present invention include 4-chlorobenzyl tertiary-butyl trithiocarbonate; 3,4-dichlorobenzyl tertiary butyl trithiocarbonate, benzyl tertiary-butyl trithiocarbonate, 1,4-butylene bis-(tertiary butyl trithiocarbonate), benzylidene bis-(tertiary butyl trithiocarbonate), 1,2,3-tri-(tertiary butyl trithiocarbonato) propane, 1-phenyl-1,2,-bis(tertiary-butyl trithiocarbonato) ethane, methyl tertiary-dodecyl trithiocarbonate, ethyl tertiary-dodecyl trithiocarbonate, allyl tertiary-dodecyl trithiocarbonate and benzyl tertiary dodecyl trithiocarbonate, methyl tertiary-hexadecyl trithiocarbonate, allyl pentadecyl trithiocarbonate and the like.

The general method of preparing the compounds of the present invention is to prepare first a tertiary alkyl mercaptide as by reacting from 0.25 mol to 3 mols and preferably about a mol of metallic sodium with a mol of the desired tertiary alkyl mercaptan in dioxane; other solvents which are inert and water miscible may be employed but it is preferred to use dioxane as superior results are obtained when using this solvent. Dioxane is of particular utility as the solvent owing to its exceptional ability to dissolve both organic and inorganic compounds. The relatively high solubility of all the reactants, including sodium and the sodium mercaptides results in greatly accelerated speeds of action.

Another method of preparing the mercaptide is to react 0.25 mol to 3 mols and preferably 1 mol of sodium methoxide with a mol of the desired tertiary alkyl mercaptan in isopropanol or other suitable water miscible solvent.

Regardless of which procedure is used, the reactants are stirred at a temperature of from about 20° to about 50° C. for about two to about twenty-four hours; preferably, the reaction time is between ten to twenty hours. Higher temperatures may be employed if desired, but have not been found to be necessary. At the conclusion of this period, 0.75 mol to 2 mols and preferably about 1.1 mol of carbon disulfide is added to the reaction mixture whereupon an exothermic reaction takes place. After the reaction mixture has cooled, about 0.25 mol to 3 mols, preferably about 1.1 mol, of an organic halide is added to the reaction mixture and the reactants agitated at a temperature of from about 20° to 100° C. for a period of about 2 to 24 hours and preferably about six to eight hours. The reaction mixture is then diluted with a large volume of water. Dilution of the reaction mixture with from 5 to 10 volumes of water is satisfactory. If the particular reaction product is a solid, it may be obtained directly from the aqueous mother liquor by filtration. In the event the reaction product is not a solid, it may be conveniently isolated by extraction with a suitable non-water miscible solvent such as benzene or ether, followed by distillation which may be under reduced pressure.

In the event a low molecular weight tertiary alkyl mercaptan such as tertiary butyl mercaptan is used as the starting material, the process of preparing the mercaptide may be modified by reacting 0.25 mol to 3 mols, preferably about 1 mol, of sodium hydroxide with about a mol of the tertiary alkyl mercaptan in water. The lower mercaptans are much more reactive than the higher members of the series and form the sodium mercaptide from sodium hydroxide obviating the necessity of using the more reactive metallic sodium or sodium methoxide.

Using the above general method, the following specific method may be used for the preparation of tertiary butyl benzyl trithiocarbonate. 54 grams (1 mol) of sodium methoxide was dissolved in isopropanol. 93 grams (1 mol) of tertiary butyl mercaptan (95% purity) was added to the solution over a period of five minutes, followed by the addition of 76 grams (1 mol) of carbon disulfide. The reaction mixture was stirred for one hour at 25° C., whereupon 126.5 grams (1 mol) of benzyl chloride was then added over a period of one hour, while the temperature was maintained at between 10°–20° C. After stirring at room temperature (25° C.) for one hour, the reaction mixture was heated to 65° C. for four hours. After standing for 24 hours at room temperature, the mixture was filtered and the solvent was then distilled off under reduced pressure. The residue was then vacuum distilled. The product was an orange colored oil boiling at 220°–223° C. at 1.8 mm. of Hg. The yield was 18%.

Again using the above general procedure, the following method was used in the preparation of methyl tertiary dodecyl trithiocarbonate. About 11.5 grams (½ mol) of metallic sodium was stirred with 300 ml. of dioxane and 105 grams (½ mol) of tertiary dodecyl mercaptan. The stirring was continued for two hours at 104° C. The resulting solution was cooled to 25° C. and 42 grams (0.55 mol) of carbon disulfide was added over a period of 15 minutes. The temperature spontaneously increased to 55° C. and the reaction mixture was stirred one-half hour and at the end of that time cooled to 15° C. An additional 100 ml. of dioxane was added to facilitate stirring. About 66.5 grams (0.7 mol) of methyl bromide was then passed in over a period of 30 minutes. After the addition of methyl bromide was completed, the reactants were stirred at 25° C. for two hours and finally at 65° for another two hours. The reaction mixture was then diluted with 500 ml. water. The upper layer containing the product was removed by decanting and was then washed with water at 60° C. The volatile impurities were then removed by vacuum distillation. The yield was 78.5% based on the mercaptan used.

In carrying out the reaction of the present invention, it is preferred that stoichiometric quantities of the reactants be used although the reaction will proceed in quantities considerably removed from this ratio. It is preferred to conduct the operation between 20° to 50° C., although higher temperatures may be employed if desired. The reaction may be conducted at atmospheric, sub-atmospheric or super-atmospheric pressures although operation at normal pressure is quite satisfactory and is ordinarily used.

The compounds of the present invention may be used as intermediates for the preparation of other compounds and have utility in themselves, both as insecticides and as miticides, as the following data show:

The compounds of the present invention have been extensively tested both for their effect on mites and insects. The test animals employed were the two-spotted spider mite, *Tetranychus bimaculatus* Harvey and the aphis *A. rumincus*.

For testing the compounds of the present invention against the two-spotted spider mite, both post-embryonic stages and eggs were used. The toxicant under test was made into an acetone solution at a concentration of 2.5 grams per 100 ml. The solution was added to water in an amount necessary to furnish a spray having a concentration of toxicant of 0.25%. In addition, the following adjuvants at the concentrations shown were used in the spray to facilitate dispersibility and wetting: methyl cellulose at 0.005% and Vatsol OT (a higher alcohol ester of sodium sulfosuccinic acid) at .015%.

Pinto bean plants were infested with all motile stages of two-spotted spider mite. The mites were permitted to inhibit the plants for two days, during which time they deposited eggs and became firmly established on the surface of the leaves. At the end of this time the plants were sprayed thoroughly with the above mentioned preparations and were then isolated in a greenhouse for a period of 7 days. After this time they were carefully examined and the number of dead and live eggs and post-embryonic stages recorded. The data were reported as the percentage killed so that in the table which follows, 100 refers to 100% of the mites or eggs being killed in that particular test:

*Table I*

| Compound | Percent Mortality | |
|---|---|---|
| | Post-embryonic | Eggs |
| 4-chlorobenzyl tertiary-butyl trithiocarbonate | 100 | 100 |
| 3,4-dichlorobenzyl tertiary butyl trithiocarbonate | 87 | 87 |
| Benzyl tertiary-butyl trithiocarbonate | 100 | 100 |
| 1,4-butylene bis-(tertiary butyl trithiocarbonate) | 100 | 100 |
| Benzylidene bis-(tertiary butyl trithiocarbonate) | 100 | 100 |
| 1,2,3-tri(tertiary butyl trithiocarbonate) propane | 67 | 87 |
| 1-phenyl-1,2-bis(tertiary butyl trithiocarbonate) ethane | 87 | 87 |
| Methyl tertiary-dodecyl trithiocarbonate | 87 | 87 |
| Ethyl tertiary-dodecyl trithiocarbonate | 87 | 100 |
| Allyl tertiary-dodecyl trithiocarbonate | 87 | 87 |
| Benzyl tertiary dodecyl trithiocarbonate | 100 | 87 |

Tests on the aphid were conducted in a manner similar to that employed for the two-spotted spider mite. Each toxicant was used at a concentration of 1% and the broad bean plant was used as a host plant. Infested plants were sprayed to dripping; the number of live and dead aphids was determined two days after the spray was applied. The data were again reported as the percentage killed.

*Table II*

| Compound | Percent Mortality |
|---|---|
| Methyl tertiary-dodecyl trithiocarbonate | 100 |
| Ethyl tertiary-dodecyl trithiocarbonate | 87 |
| Allyl tertiary-dodecyl trithiocarbonate | 45 |
| Benzyl tertiary-dodecyl trithiocarbonate | 67 |

I claim:

1. As a new composition of matter, a compound having the formula:

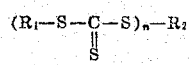

wherein $n$ is an integer of from 2 to 4, $R_1$ is a tertiary alkyl radical having from 4 to 16 carbon atoms and $R_2$ is a radical chosen from the group consisting of aliphatic, aromatic, alkaryl, aralkyl and halogen substituted aromatic radicals.

2. As a new composition of matter, 1,4-butylene bis-(tertiary butyl trithiocarbonate).

3. As a new composition of matter, benzylidene bis-(tertiary butyl trithiocarbonate).

4. The method of making the compound having the general formula:

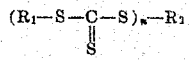

wherein $n$ is an integer of from 2 to 4, $R_1$ is a tertiary alkyl radical having from 4 to 16 carbon atoms and $R_2$ is a member chosen from the group consisting of aliphatic, aromatic, alkaryl, aralkyl and halogen substituted aromatic radicals comprising reacting an alkali metal tertiary alkyl mercaptide having an alkyl radical corresponding to $R_1$ in the above formula with carbon disulphide and an organic halide wherein the organic portion of the halide corresponds to the radical $R_2$ in the above formula.

5. The process of claim 4 wherein the reaction is conducted with dioxane as a solvent.

6. The process of making 1,4-butylene-bis(tertiary butyl trithiocarbonate) comprising reacting sodium tertiary butyl mercaptide with carbon disulfide and 1,4-dichlorobutane.

7. The process of making benzylidene bis(tertiary butyl trithiocarbonate) comprising reacting sodium tertiary butyl mercaptide with carbon disulfide and benzylidene chloride.

References Cited in the file of this patent

UNITED STATES PATENTS

| | | |
|---|---|---|
| Re. 22,750 | Tisdale et al. | Apr. 30, 1946 |
| 2,197,964 | Bishop | Apr. 23, 1940 |
| 2,325,720 | Urbschat et al. | Aug. 3, 1943 |
| 2,396,487 | Blake | Mar. 12, 1946 |
| 2,410,862 | Bousquet et al. | Nov. 12, 1946 |
| 2,438,599 | Blake | Mar. 30, 1948 |
| 2,498,936 | Badertscher | Feb. 28, 1950 |
| 2,547,150 | Blake et al. | Apr. 3, 1951 |
| 2,600,737 | Crouch | June 17, 1952 |